US005901438A

United States Patent [19]

[11] Patent Number: 5,901,438

[45] Date of Patent: May 11, 1999

Kurihara

[54] APPARATUS AND METHOD FOR INTRODUCING CABLES INTO OR THROUGH A PART

[75] Inventor: Kiyokazu Kurihara, Yokkaichi, Japan

[73] Assignee: Sumitomo Wiring Systems, Ltd., Japan

[21] Appl. No.: 08/841,202

[22] Filed: Apr. 29, 1997

[51] Int. Cl.[6] .......................... H01R 43/00; H01R 43/20; B23P 19/04

[52] U.S. Cl. ................................ 29/857; 29/235; 29/754; 29/755; 29/854; 29/881

[58] Field of Search ............................ 29/235, 450, 451, 29/754, 755, 854, 857, 881

[56] References Cited

U.S. PATENT DOCUMENTS

| | | | |
|---|---|---|---|
| 2,593,081 | 4/1952 | Wilmot | 29/754 X |
| 2,683,924 | 7/1954 | Schryver | 29/754 |
| 4,653,182 | 3/1987 | Fukuda et al. | 29/754 |
| 5,016,346 | 5/1991 | Gerst et al. | 29/450 X |
| 5,315,757 | 5/1994 | Koch et al. | 29/754 |
| 5,432,996 | 7/1995 | Imgrut et al. | 29/754 |
| 5,743,002 | 4/1998 | Ito et al. | 29/754 |

FOREIGN PATENT DOCUMENTS

| | | |
|---|---|---|
| 0 271 753 | 6/1988 | European Pat. Off. . |
| 0 533 045 A2 | 3/1993 | European Pat. Off. . |

*Primary Examiner*—Peter Vo
*Attorney, Agent, or Firm*—Anthony J. Casella; Gerald E. Hespos; Ludomir A. Budzyn

[57] ABSTRACT

An apparatus and method are provided for introducing at least one cable C connected with a connector 20 into or through a grommet 30 having openings provided therefor. The apparatus has a second element 12 for at least partly accommodating the cable C and the connector 20 and a first element 18 for at least partly accommodating the cable C and the grommet 30. The elements 12,18 surround the cable C over its entire length and are movable with respect to each other while holding the connector 20 and the grommet 30 in respective positions to introduce the cable C into or through the grommet 30.

17 Claims, 4 Drawing Sheets

APPARATUS AND METHOD FOR INTRODUCING CABLES INTO OR THROUGH A PART

BACKGROUND OF THE INVENTION

1. Field of the Invention

The invention relates to the assembly of one or more cables with a part such as a connector or a grommet into or through which said one or more cables are to be inserted or passed through. In particular the invention is directed to the assembly of a wiring harness comprising at least one connector, one grommet, one cable and a sleeve or tube surrounding said cable. The invention provides an apparatus and method for inserting and/or passing at least one cable into and/or through a part having openings for accommodating said at least one cable.

2. Description of the Prior Art

Japanese Unexamined Utility Model Publication No. 6-88127 shows a device which enables a plurality of cables to be passed simultaneously through a grommet. This known device comprises a holding tool and a wire positioning portion, both of which are on a fixed base. The holding tool is operative for holding the grommet. The wire aligning table comprises a wire pressing portion for restraining the wires on the wire aligning table. The pressing portion is openable and closable. An operating lever enables the grommet holding tool to be pushed towards and away from the wire positioning portion.

This known device has some inherent problems, including: the risk of damaging the wires or cables, in particular the coating thereof surrounding the conductors making up the cables; the risk of scratching and/or deforming, in particular bending the cables as they are passed through the grommet; the susceptibility of the grommet to damage; the cumbersome operation; and no possibility for automation.

It is an object of the invention to provide an apparatus and a method for inserting and/or passing at least one cable in and/or through a part having openings for accommodating said at least one cable, with which the risk of damage and/or deformation of said at least one cable is eliminated.

It is a further object of the invention to provide an apparatus and a method which protect the part such as a connector or grommet against damage.

It is yet a further object of the invention to provide an apparatus and a method which enable automation and realize enhanced ease of use, in particular simplified handling and shortened time requirements.

It is still another object of the invention to provide an apparatus and a method capable of inserting and/or passing said at least one cable in and/or through the part in one step or stroke.

SUMMARY OF THE INVENTION

According to the invention, an apparatus is provided for inserting and/or passing at least one cable connected to a first part such as a connector, in and/or through a second part, such as a connector grommet having openings for accommodating and for the insertion and/or passage of said at least one cable. The apparatus comprises at least one element for at least partly accommodating said cable and said first part, in particular said connector. The apparatus further comprises at least one element for at least partly accommodating said cable and said second part. The elements are moveable with respect to each other while surrounding said cable substantially over the entire length thereof and while holding said two parts, in particular said connector and said grommet or connector in their respective positions.

Accordingly, the distance separating said two parts can be reduced while said cable is protected and in particular held and/or guided by said elements surrounding said cable substantially over the entire length thereof. In particular the amount about which said one or more cables are passed through said second part, in particular connector or grommet, is particularly unlimited, as the risk of damage or deformation of said one or more cables is eliminated by the protecting, holding and/or guiding action of said at least one element which surrounds said cable(s).

Further, sleeve or tube surrounded cables easily can be handled or processed with such an apparatus and a sleeve or tube is automatically compressed by the action of the two held parts which come into contact with the ends of the sleeve or tube while the cables are inserted and/or passed. It is to be noted that a sleeve retaining means, e.g. a pin or the like, may also be provided for holding this tube or sleeve compressed, in particular against the restoring force thereof. Preferably, the spaces for accommodating said two parts in the respective elements exactly correspond to the form of the held elements such that the movements thereof are fully inhibited. Of course, it is also possible to provide a certain amount of play for facilitating the insertion and arrangement of said parts in said elements. Preferably the elements comprise marks or indexing means and/or positioning means such as a pin to arrange said parts appropriately in said elements, in particular to prevent any rotation and/or misalignment of said held parts.

Said elements may form or contain a telescopic mechanism as a simple construction for simultaneously allowing the movement of said elements with respect to each other while protecting and/or holding said one or more cables. In this context, an arrangement similar to that of antennas or different arrangements having the same function, may be employed. As the parts are preferably fully accommodated in said elements, the inventive apparatus is particularly well suited to handling parts consisting of a multiple of subparts such as a three-part grommet. In contrast to the known prior art, it is not necessary at all to impart any clamping force onto said one or more cables. Thus, the inventive apparatus provides optimum protection for said one or more cables, which is in particular necessary when delicate cables such as teflon coated cables are handled or when a tight engagement of the cables with at least one of said parts is required.

Preferably, one of said elements is allowed to at least partly enter the other element during the relative movement of the elements. Accordingly, a simple construction allows a guided relative movement of said elements, while guidingly and holdingly passing said surrounded cable through said second part. By allowing the one element to enter the other, said elements can properly be guided. Of course, the amount that the one element can enter the other can be restricted by providing a contact surface or stop member, thus defining the amount that said at least one cable is passed through said part, if said at least one cable is already inserted in said second part at the beginning of said relative movement. Thus the other element into which said one element may be inserted is designed and constructed to have a defined space for accommodating the inserted portion of said one element.

Preferably, the apparatus further comprises a cable guide means for guiding said surrounded cables. The guiding means is in particular provided near or at that element surrounding said cable. Said guiding means may be provided as a restricted portion of one of said elements and/or of said telescopic means. By providing an additional guiding means, the surrounded cable is supported not only by inner walls of said elements, but also by the guiding means which is in particular spaced one or both of said elements. The guiding means is preferably provided such that the cables are guided without restricting their movement in their lengthwise direction. Accordingly said guide means can be formed by rollers or projections extending into the space for accommodating said cable. Preferably said cable guide means is provided for guiding independently each of said one or more cables in order to enhance the reliability of the apparatus, with the result that the risk of misalignment of said one or more cables can further be reduced.

In the inventive apparatus, said elements are preferably openable for the insertion and removal of said cable, said first part, such as a connector and said second part such as a grommet or connector. In particular, each element is formed by top and base portions that are hingedly connected with each other so to be openable and closable with respect to each other. Said top and base portions have recesses for accommodating said parts and said one or more cables, wherein in particular spaces are defined for the respective parts and said cable in the closed position. The spaces for accommodating said parts such as connectors or grommets are preferably formed such that a movement of said parts is substantially prevented, wherein a little play or extra space may be provided for facilitating the insertion and arrangement of said parts.

In the space defined in one or both elements for accommodating and in particular fully surrounding said cables, said one or more cable is prevented from bending by providing a substantially large facial contact between said surrounded cables and said elements. It is also to be noted, when said one or more cables are surrounded by a tube, sleeve or sheaths, the space should be adapted accordingly. Said elements may also be biased toward the open or closed position to enhance the ease of use. Further, locking means may also be provided for lockingly holding the respective elements in their closed positions.

Preferably, the element for accommodating the second part, in particular connector or grommet is provided with a through hole for allowing the passage of said cable having passed through said second part. Accordingly, the cables having passed through said second part are also protected against deformation and damage and in particular guided and held for further processing or working.

One of the elements, in particular the space for accommodating said cables is provided with at least one space for allowing corrugation of a sleeve or tube surrounding said at least one cable. By providing such a defined space said one or more cables at portions other than the above space can more accurately be held, guided and protected. Accordingly, said tube or sleeve in its compressed state, can be handled with greater ease.

The inventive apparatus preferably further comprises cable hold means for holding portions of said surrounded cables, in particular by imparting a relative small force directly onto said one or more cables or by imparting a force on a tube or sleeve surrounding said one or more cables. The cable hold means may be formed by projections extending into said space for accommodating said one or more cables. Particularly, said cable hold means restricts the movement of said surrounded cables to at least one direction, preferably inhibits the movement of said surrounded cables in all but one direction, in particular corresponding to the direction of passage of said one or more cables through said second part. This function may be achieved by provided cam means, in particular eccentric cam means. Said one or more surrounded cables can also be held via the action of the corrugated or compressed tube or sleeve in said particularly adapted space(s) for the corrugation thereof, wherein the inner surface of said corrugated tube or sleeve acts on said surrounded cables, whereas the outer portion or surface thereof acts against the inner surfaces of said space for accommodating the corrugation of said tube or sleeve.

Preferably, the apparatus further comprises guide means for guiding said relative movement of said elements. By providing the guide means such as a guide rail, a proper alignment of the respective elements can be ensured, thereby enhancing the proper operation of said apparatus and the reliability thereof. Said elements are preferably connected with each other by glide rods such that the opening and closing thereof can be performed substantially simultaneously, while said connecting rods also act as guide means for guiding the relative movement of said elements. Accordingly, elements can be opened and closed in one step while said elements can be displaced a long distance with respect to each other by being guided.

The length about which said one or more cables are to be passed through said second part may be adjusted or set by using differently sized elements or by using a different number of elements. In this context it is preferred to use intermediate elements, substantially surrounding the cable and/or providing supplementary space for allowing relative movement of said elements.

Finally, it is preferred that the inventive apparatus further comprise actuation means for causing said relative movement of said elements. The actuation means may be any arbitrarily chosen device for causing said relative movement, in particular gliding movement of said elements, such as a hydraulic or pneumatic piston cylinder assembly, a handle or lever, an electric motor, a spindle gear means and, a gear rod. Accordingly the apparatus enables a high degree of automation wherein the protection of said held or surrounded cables is considerably improved.

The inventive method for introducing one cable into and/or through a part comprises the first step of arranging a second part into or through which said cable is to be inserted and/or to be passed, said cable and said first part are in openable housing elements, such that substantially the entire length of said cable is contained within said elements. The method continues by closing said elements; and moving said elements towards each other in order to introduce and/or pass said cable into and/or through said second part. Accordingly, this method enables the insertion and/or passing of a cable through a part over a large distance, in particular in one step or one stroke. Thus the inventive method provides high potential with respect to automation and provides also improved protection for said one or more cables. It should be noted that the inventive method may be better implemented by making use of the inventive apparatus and its preferred features. It is preferred that the end(s) of said one or more cables to be inserted and/or passed through said second part be connected with the first part. However, the apparatus and method will substantially provide the same benefits and effects even when this first part is omitted. That is, one of said elements can directly act onto one end of said one or more cables instead of acting on said first part connected to one end of said surrounded, held and/or guiding cables.

Further advantages and features will be more clear when reading the description of several preferred embodiments taking reference to the enclosed drawings.

BRIEF DESCRIPTION OF THE DRAWINGS

A preferred embodiment of the inventive apparatus and method will be described with reference to the attached drawings.

DETAILED DESCRIPTION OF THE PREFERRED EMBODIMENTS

Figure 1:
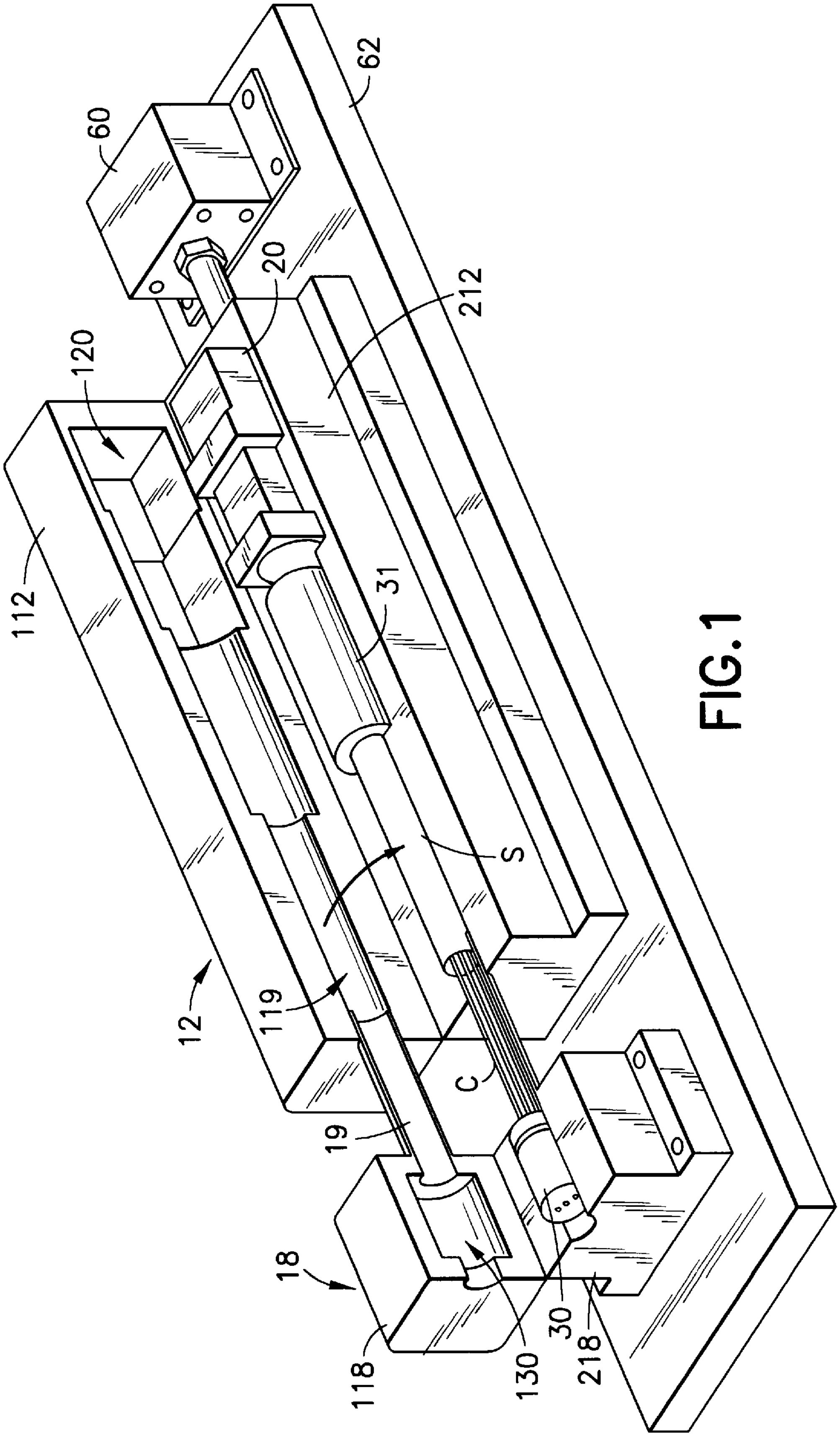
FIG. 1 is a perspective view of a preferred embodiment of the inventive apparatus comprising two elements which are shown in a spaced and open state.

The preferred embodiment of the apparatus as shown in FIG. 1 comprises a base plate 62, onto which a first element 18 is fixed, i.e. firmly mounted. The first element 18 comprises a base portion 218 and a top portion 118. The base and top portions 118, 218 of the first element 18 are hingedly connected with each other, and are provided for accommodating a part 30 such as a grommet 30 in FIG. 1. The shown grommet 30 is a three-part rubber grommet which is provided with through passages or holes into which cables C are to be inserted or through which cables C are to be passed.

At one side of the first element 18, there is provided a passage 132 for allowing the cables C to exit the first element 18. The passage 132 is formed by recesses which are provided in the top and base portions 118, 218 of said first element 18. At the opposite side of the first element 18, a telescopic means 19 is provided. In the shown embodiment, the telescopic means 19 comprises upper and lower portions which are integrally formed with the top and base portions 118, 218, respectively. Thus, when said top and base portions 118, 218 are closed with respect to each other, the telescopic means 19 is also closed. The telescopic means 19 is most simply constructed by two halves of a pipe. Though not shown in the drawings, a tapered telescopic means may be advantageous for more accurately guiding cables C and/or a sleeve S surrounding said cables as will be described later.

The apparatus of this embodiment further comprises a second element 12 which is slidably arranged on the base plate 62. Preferably, the second element 12 may be guided by an unillustrated guide rail for allowing a linear sliding movement of the second element 12 with respect to the first element 18. In the shown embodiment, the second embodiment 12 is also constructed by a base portion 212 and a top portion 112 which are hingedly connected with each other. The top and base portions 112, 212 of the second element 12 are formed with a recess which comprises a recessed part 120 for accommodating a connector 20 or any other part onto which cables C are mounted. On the left side of the recess portion 120, there is formed a recessed portion of smaller size for accommodating a metal protective cap 31 which will cover the part after the insertion of the cables C. Further, in the walls of the top and base portions 112, 212 of the second element 12, there is formed a recess 119 in which the telescopic means 19 is slidable.

The two elements 12 and 18 are aligned substantially in a line and are spaced to the extent that a small portion of the telescopic means 19 is accommodated in the recesses 119 of said second element 12. There is provided an actuation means 60 for causing a relative movement of the second element 12 with respect to the first element 18.

The cables C connected with the connector 20 are arranged in the recesses of the first and second elements 18, 12. The cables C connected with said connector 20 are surrounded by a tube or sleeve for protecting the cables C and by the metal protective cap 31. At the ends of the cables C opposite to the connector 20, there is mounted the grommet 30 accommodated in the recess of the base portion 218 of the first element 18. In FIG. 1, the cables C are already slightly inserted into the openings of the grommet 30 provided therefor.

Figure 2:
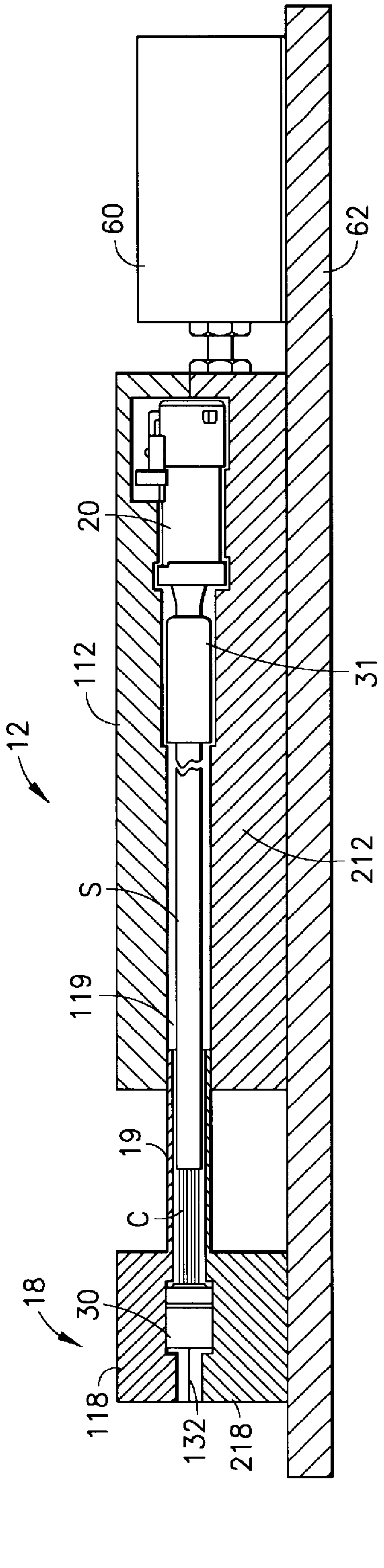
FIG. 2 is a longitudinal sectional view of the apparatus shown in FIG. 1, wherein the elements are closed.

In FIG. 2, the embodiment of FIG. 1 is shown in a lengthwise sectional view, wherein the same parts are denoted with the same reference numerals. As it can clearly be seen in FIG. 2, the top and base portions 118, 218, 112, 212 of the first and second elements 18, 12 are closed with respect to each other, respectively and the connector 20 is held in the recess portion 120 substantially without being clamped, but still with any movement thereof inhibited. Adjacent to the connector 20, the metal protective cap 31 is accommodated in a space defined by the top and base portions 112, 212 of the second element 12 which is slightly smaller than the recess portion 120, but larger than the recess 119 for accommodating the telescopic means 19. With the grommet 30 accommodated in the first element 18, it can clearly be seen that all parts are properly aligned with respect to each other, in particular in the direction in which said cables C extend. Although the cables C are already slightly inserted into the grommet 30 in FIG. 2, a cable hold and/or positioning means for properly holding and/or positioning the one or more cables C with respect to the grommet 30 may additionally be provided. This can, for instance, simply be achieved by providing the telescopic means 19 with a specific configuration such as a taper or by providing a guiding projection which should, however, not restrict the movement of the cables C in the lengthwise direction. Although not shown in the figures, the top portions 118 and 112 are coupled with each other, such that the opening and closing with respect to the base portions 218, 212 can easily simultaneously be performed. This can be achieved, for instance, by providing a pin at the top portion 118 of the first element 18 which is slidably received in a bore in the second element 12.

Figure 3:
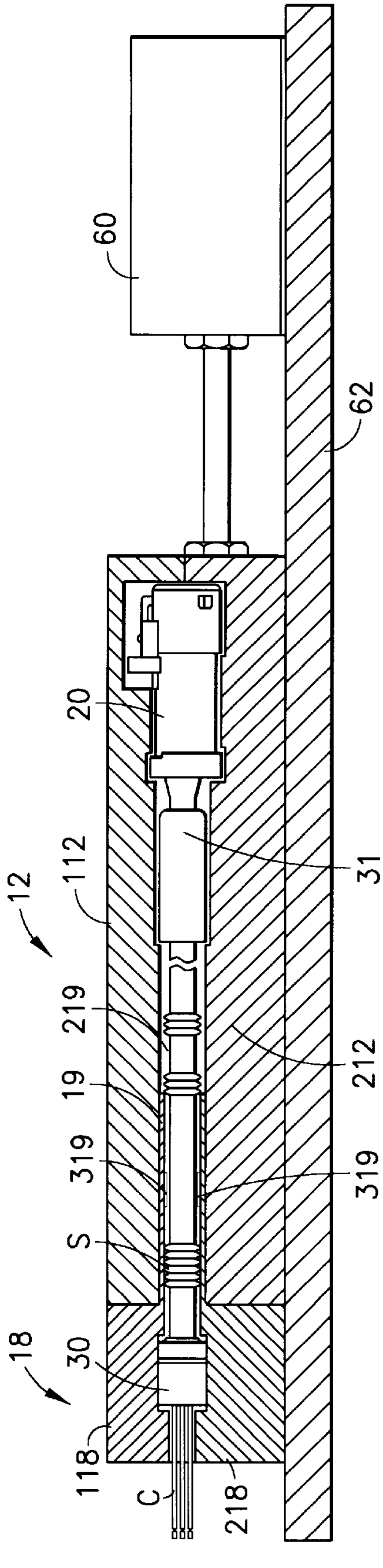
FIG. 3 is a view similar to FIG. 2, in which the elements are shown after relative movement with respect to each other.

In FIG. 3, the apparatus is shown in a similar sectional view as in FIG. 2, wherein the second element 12 has been moved towards the first element 18 by the actuation means 60. As shown in FIG. 3, the two elements 12, 18 are abutting against each other, such that the telescopic means 19 is substantially entirely accommodated in the recess 119 of the second element 12. According to the movement of the second element 12, the cables C are passed through the grommet 30 and exit the first element 18 through the passage 132. During the relative movement of the elements 12, 18, the sleeve surrounding said cables C is compressed while being corrugated. Preferably, a specific space 219 is provided for allowing the corrugation of the sleeve S so as not to interfere the relative movement of the elements 12, 18. There is also provided a sleeve holding or guiding means 319 which is an annular projection in FIG. 3. The projection 319 may also extend over substantially the entire length of the telescopic means 19, such that the cables C surrounded by the sleeve S are more accurately positioned and guided. A further advantage when using the projection 319 is that the corrugation takes place only in the specific space 219.

As can be seen both from FIGS. 2 and 3, the cables C within the apparatus are surrounded substantially over their entire length by the two elements 12, 18. Thus, the cables C are protected and guided over the entire length, such that a deformation, in particular buckling or any other damage to the cables C is avoided.

Figure 4:
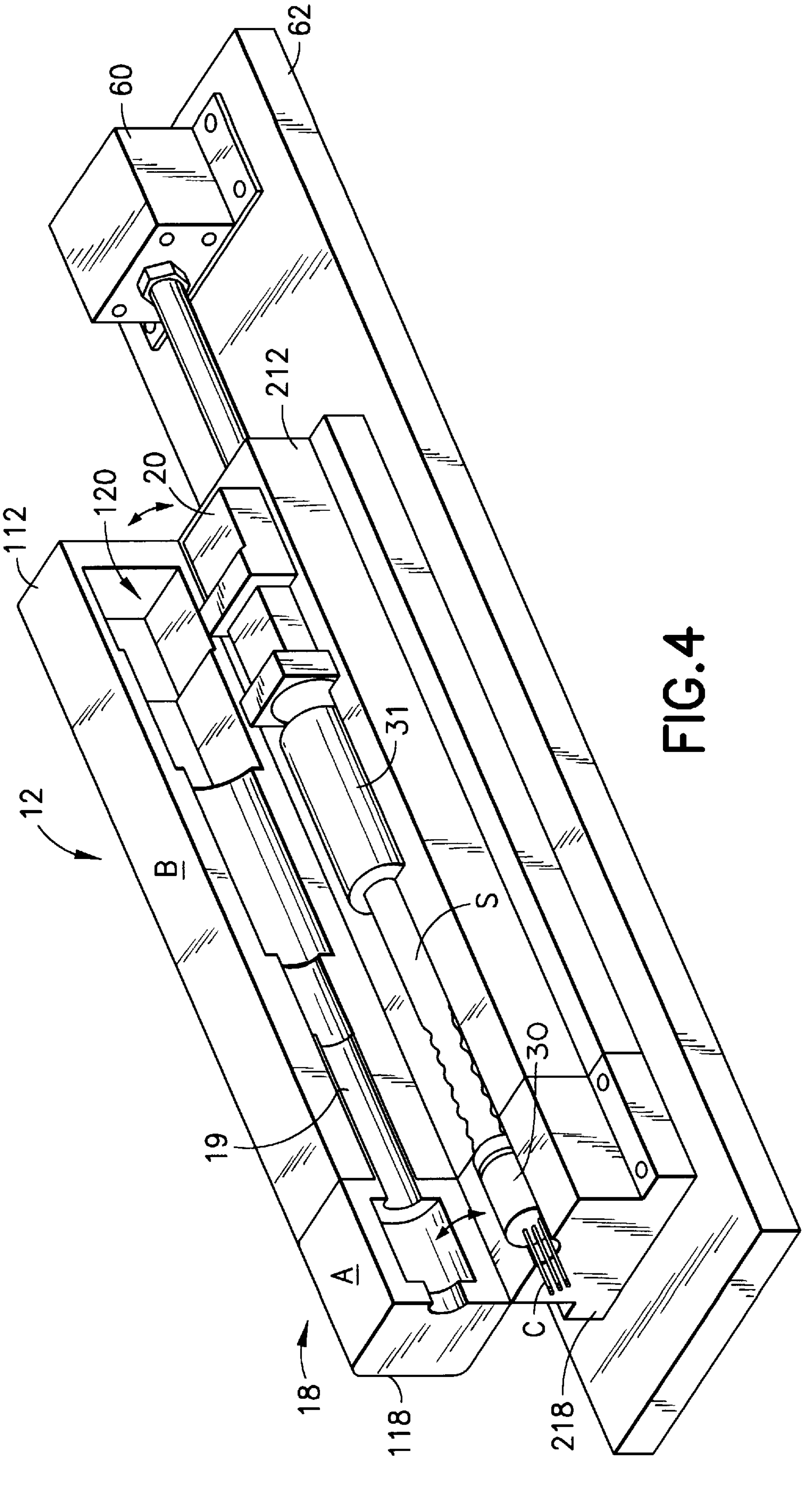
FIG. 4 is a perspective view similar to FIG. 1 after relative movement of said elements with respect to each other.

In FIG. 4, the embodiment of the proceeding figures is shown in an opened state, wherein the two elements 12, 18 are arranged in the positions of FIG. 3. Although the two elements 12, 18 are respectively formed of top and base portions in the shown preferred embodiment, it is also possible to provide one of the elements as a multipart element, in particular being divided into several subelements in the direction in which the cables C extend. By providing different subelements, the respective elements can be adapted for different needs, in particular for different lengths of cable assemblies to be formed. The actuation means 60 can be any of known means such as an electric motor, a hydraulic or pneumatic cylinder or also a simple mechanical handle for causing the relative movement of the two elements with respect to each other. Further, an arrangement may be such that the first element 18 is moved with respect to the second element 12.

A preferred embodiment of the inventive method, in particular the use of the preferred apparatus will be described with reference again to FIGS. 1 to 4.

In a first step, the connector 20 is connected and preassembled with the ends of cables C at one side. The cables C are surrounded by a tube or sleeve S and by the metal protective cap 31 which will serve later on to protect the part or grommet 30 which will be mounted at the other end of the cables C. Then, the connector 20 connected with the cables C, the surrounding sleeve S and the metal protective cap 31 are arranged in the specifically designed second element 12. The respective parts are arranged in the corresponding recesses in the lower portion 212 of the second element 12. At the same time, the cables C extending out of the sleeve S are arranged on a lower half of the telescopic means 19, such that they are opposite to the openings formed in the grommet 30 which is accommodated in the lower portion 218 of the first element 18. Alternatively, the ends of the cable C may already be inserted into the respective openings of the grommet 30.

When the connector 20, the cables C, the sleeve S, the metal protective cap 31 and the grommet 30 are properly positioned on the respective base portions 218, 212 as shown in FIG. 1, the top portions 112, 118 are closed with respect to the base portions 212, 218. As stated above, this action can preferably be performed by a single step, when the two top portions 112, 118 are linked with each other. Accordingly, the cables C are surrounded substantially over the entire length thereof by the combination of the two elements 12, 18 as shown in FIG. 2. Preferably, although not shown in the figures, the respective top and base portions are lockingly held in this position. Afterwards, the actuation means 60 is actuated in order to move the second element 12 toward the first element 18, such that the cables C are passed first through the grommet 30 and afterwards through the passage 132, exiting the first element 18.

During the relative movement, the telescopic means 19 is further received in the second element 12, in particular in the recess 119 provided for this purpose. Further, during the relative movement, the sleeve S is not compressed until it reaches the end surface of the grommet 30. Alternatively, it is possible to hold the sleeve S by a projection 319, as shown in FIG. 3, thus inhibiting any relative movement of the sleeve S into the first element 18. While being restrained by the projection 319 or by being abutted against the grommet 30, the sleeve S is compressed while being corrugated. Preferably, the corrugation takes place in a well-defined space such as in the space 219 shown in FIG. 3.

After a predetermined amount of relative movement, corresponding substantially to the desired length of the passage of the cables C through the grommet 30, the state of FIG. 3 is obtained. Accordingly, during the whole time of relative movement, the cables C are substantially entirely surrounded by the elements 12, 18, thereby preventing any deformation or damage of the cables C. Thus, by providing a long telescopic means and increasing the amount of the relative movement, the cables C are allowed to pass through the grommet 30 by an almost unlimited length.

When the state shown in FIG. 3 is reached, the grommet 30 is correctly positioned with respect to the cables C. Accordingly, it is sufficient to open the inventive apparatus as shown in FIG. 4 to take out the thus formed cable assembly. Finally, the apparatus is brought back to its initial position for the formation of a cable assembly.

What is claimed is:

1. Apparatus for use with at least one cable having a first end connected to a connector and a second end partly inserted into a part having at least one opening for passage of said at least one cable, said apparatus being operative for passing said second end of said at least one cable through said part, said apparatus comprising a first element having a recess configured for surrounding at least a portion of said cable and said connector and at least a second element having a recess configured for surrounding said part and at least portions of said cable adjacent said part, portions of said first and second elements that surround said cable being spaced from said cable and being dimensioned and disposed for telescoped engagement with one another, said first and second elements being movable with respect to each other and parallel to the cable while surrounding said cable and while holding said connector and said part in their respective recesses for passing the cable through the part.

2. Apparatus according to claim 1, wherein said elements are openable for the insertion and removal of said connector, said cable (C) and said part.

3. Apparatus according to claim 2, wherein said second element accommodating said part is provided with a through hole for allowing the passage of said cable through said through hole after said cable has passed through said part.

4. Apparatus according to claim 2, further comprising cable hold means for holding the cable when the elements are open.

5. An apparatus according to claim 2, wherein said first and second elements have components hingedly connected to one another for opening said first and second elements.

6. An apparatus according to claim 5, wherein the components of the first and second elements are hingedly connected to one another along hinges that are substantially aligned with one another and substantially parallel to the cable.

7. An apparatus according to claim 6, further comprising a slidable connection between the movable component of the first element and the movable component of the second element, the slidable connection being substantially aligned with the hinge, such that the movable components of the first and second elements are hingedly movable substantially in unison with one another.

8. Apparatus according to claim 1, wherein at least one of said elements is provided with at least one space for allowing corrugation of a sleeve surrounding said at least one cable for preventing the sleeve from interfering with said at least one cable.

9. Apparatus according to claim 1, further comprising actuation means for causing said relative movement of said elements.

10. An apparatus according to claim 1, wherein the first element is movable and the second element is stationary relative to the first element.

11. An apparatus according to claim 1, wherein the components of one of said elements define a substantially tubular projection for accommodating at least portions of said cable, and wherein the components of the other of said elements define a tubular recess for accommodating portions of said cable, said recess being dimensioned and aligned for telescoped receipt of the tubular projection in response to movement of one of said first and second elements.

12. An apparatus according to claim 1, wherein the part has a cable entrance opening, a cable exit opening and a passage extending axially therebetween for accommodating said cable, said recess in said second element being dimensioned and configured for moving said part into the recess along a direction aligned substantially perpendicular to the axis of the part.

13. Method for introducing at least one cable through a part, comprising the steps of:

providing a cable having opposed first and second ends and having a connector mounted to said first end;

providing a part having an external surface and having an opening extending through said part;

partly inserting said second end of said cable into said opening in said part;

placing said connector and portions of said cable adjacent said connector in a first openable housing element, placing said part and remaining portions of said cable into a second openable housing element such that only portions of the external surface of the part are engaged by the second openable housing element;

closing said elements such that said cable, said connector and said part are substantially enclosed within said elements, and moving one of said elements towards the other to at least partly pass said cable through said part.

14. The method of claim 13, wherein the step of providing a cable includes providing a collapsible sleeve over said cable, and wherein the steps of placing said connector and portions of said cable adjacent said connector in the first openable housing element comprises provided space between said sleeve and said first openable housing element for accommodating corrugation of said sleeve during said step of moving one of said elements toward the other.

15. The method of claim 14, wherein the step of moving one of said elements comprises moving the first element toward the second element.

16. The method of claim 15, wherein the step of moving said first element comprises telescoping a portion of said first element over portions of said second element that surround the cable.

17. The method of claim 15, wherein the step of placing said part and remaining portions of said cable into said second open housing element is carried out such that said second openable housing element is in surrounding spaced relationship to portions of said cable placed therein.

* * * * *